United States Patent
Hollmach et al.

(10) Patent No.: US 11,441,930 B2
(45) Date of Patent: Sep. 13, 2022

(54) TUBE FOR A TRANSDUCER, TRANSDUCER COMPRISING SUCH A TUBE, AND MEASURING SYSTEM FORMED THEREWITH

(71) Applicant: Endress+Hauser Flowtec AG, Reinach (CH)

(72) Inventors: Marc Hollmach, Basel (CH); Christian Lais, Münchenstein (CH); Fabio Schraner, Basel (CH); Oliver Popp, Oberwil (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 5 days.

(21) Appl. No.: 16/958,948

(22) PCT Filed: Dec. 10, 2018

(86) PCT No.: PCT/EP2018/084195
§ 371 (c)(1),
(2) Date: Jun. 29, 2020

(87) PCT Pub. No.: WO2019/129480
PCT Pub. Date: Jul. 4, 2019

(65) Prior Publication Data
US 2020/0340836 A1  Oct. 29, 2020

(30) Foreign Application Priority Data
Dec. 29, 2017  (DE) .......................... 102017012067.6

(51) Int. Cl.
*G01F 1/32* (2022.01)

(52) U.S. Cl.
CPC .................................. *G01F 1/3209* (2013.01)

(58) Field of Classification Search
CPC ........ G01F 1/32; G01F 1/3209; G01F 1/3218; G01F 1/3245; G01F 1/3254; G01F 2/3218; G01F 1/325
See application file for complete search history.

(56) References Cited

U.S. PATENT DOCUMENTS

| 6,536,291 B1 | 3/2003 | Gysling et al. |
| 7,261,002 B1 | 8/2007 | Gysling et al. |

(Continued)

FOREIGN PATENT DOCUMENTS

| CN | 102077061 A | 5/2011 |
| CN | 203053490 U | 7/2013 |

(Continued)

*Primary Examiner* — Erika J. Villaluna
(74) *Attorney, Agent, or Firm* — Christopher R. Powers; Endress+Hauser (USA) Holding Inc.

(57) ABSTRACT

Disclosed is a tube configured to conduct a fluid flowing through the tube in a specified flow direction and for this purpose comprises a tube wall, which encloses a lumen of the tube, and an interference body, which is arranged within the tube but is nevertheless connected to the tube wall at an inner face of the tube wall facing the lumen. In the tube according to the present disclosure, the tube wall has a maximum wall thickness of more than 1 mm and at least two mutually spaced sub-segments with a respective wall thickness that deviates from said maximum wall thickness, wherein the sub-segment is positioned upstream of the interference body in the flow direction, and the sub-segment is positioned downstream of the sub-segment in the flow direction.

18 Claims, 4 Drawing Sheets

(56) References Cited

U.S. PATENT DOCUMENTS

| | | | |
|---|---|---|---|
| 8,548,753 B2 * | 10/2013 | Rogers | G01F 25/0007 |
| | | | 702/47 |
| 10,571,317 B2 * | 2/2020 | Erdler | G01F 1/383 |
| 2002/0157476 A1 | 10/2002 | Dietrich | |
| 2003/0172742 A1 | 9/2003 | Brookshire et al. | |
| 2017/0328750 A1 | 11/2017 | Jehle et al. | |

FOREIGN PATENT DOCUMENTS

| | | | |
|---|---|---|---|
| CN | 107110675 A | | 8/2017 |
| DE | 102017202896 A1 | | 8/2018 |
| EP | 1253412 A2 | | 10/2002 |
| EP | 2275783 A2 | | 1/2011 |
| JP | 2001194193 A | * | 7/2001 |
| JP | 6082281 A | | 10/2013 |
| WO | 2008061551 A1 | | 5/2008 |
| WO | 2009158605 A2 | | 12/2009 |
| WO | 2010137192 A1 | | 12/2010 |
| WO | 2010137392 A1 | | 12/2010 |
| WO | 2013180843 A2 | | 12/2013 |

* cited by examiner

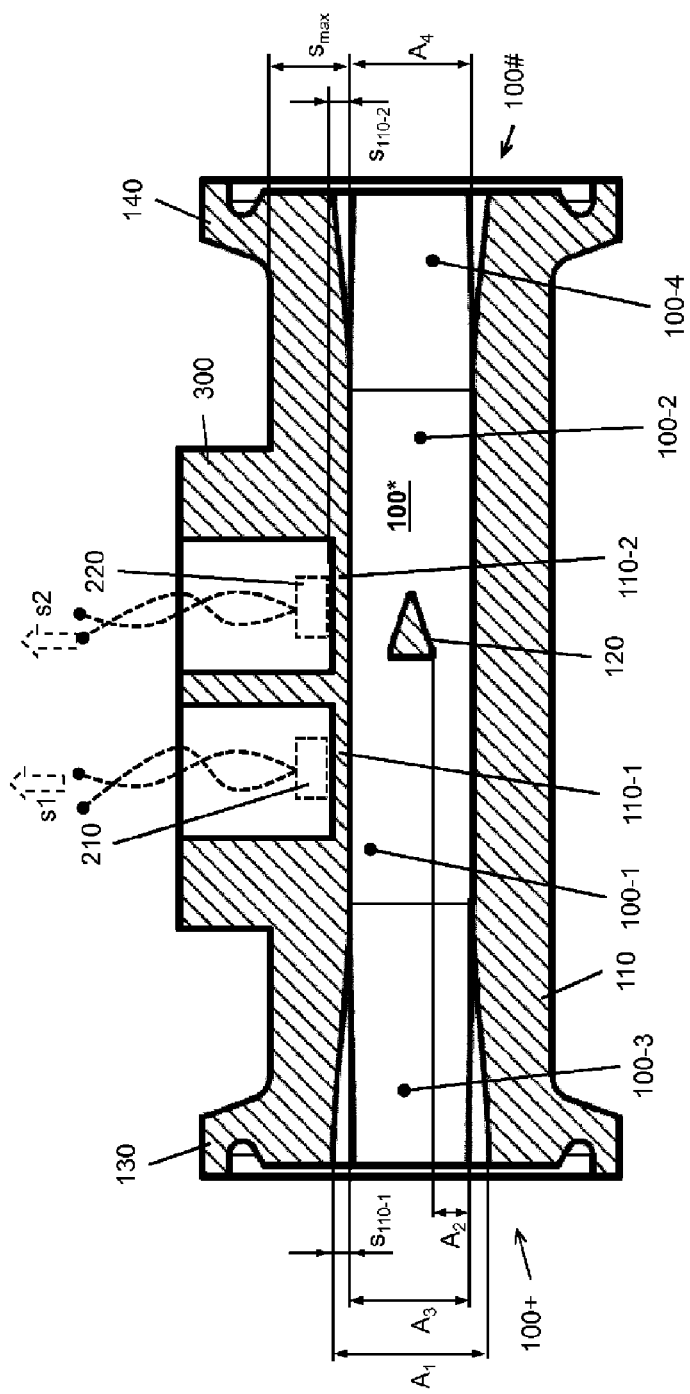
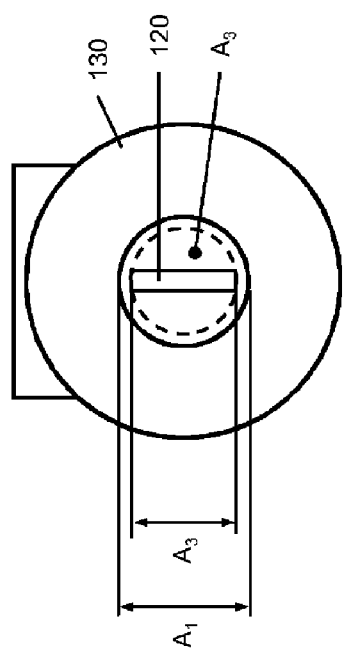
Fig. 3A
Fig. 3B

TUBE FOR A TRANSDUCER, TRANSDUCER COMPRISING SUCH A TUBE, AND MEASURING SYSTEM FORMED THEREWITH

CROSS-REFERENCE TO RELATED APPLICATIONS

The present application is related to and claims the priority benefit of German Patent Application No. 10 2017 012 067.6, filed on Dec. 29, 2017 and International Patent Application No. PCT/EP2018/084195, filed on Dec. 10, 2018, the entire contents of which are incorporated herein by reference.

TECHNICAL FIELD

The invention relates to a tube suitable for a transducer and to a transducer formed by means of such a tube for detecting a measurement variable of a flowing fluid, or to a measuring system formed therewith for measuring a flow parameter of a fluid flowing in a pipe.

BACKGROUND

In process, measuring and automation technology, measuring systems that are often designed as Vortex flow meters or as differential pressure flow meters are used for the measurement, for measuring flow parameters, for example a flow velocity and/or a volume flow rate, of fluids flowing in the pipe, especially, fast-flowing and/or hot gases and/or fluid flows having a high Reynolds number (Re), or of volume or mass flow rates corresponding to a respective flow velocity (u). Examples of such measuring systems are known, among other things, from JP-A 0682281, US-A 2017/0328750, WO-A 2008/061551, WO-A 2009/158605 or WO-A 2013/180843 and are also offered, among other things, by the applicant itself, for example under the product designation "DELTABAR PMD 55".

The measuring systems shown each comprise a transducer, which is used to detect pressure fluctuations in the flowing fluid, for example, namely, to detect pressure fluctuations in a Kármán vortex street formed in the flowing fluid, and/or to detect a pressure drop occurring in the flowing fluid, and a measurement electronics unit, which is coupled thereto and configured to receive and process sensor signals generated by means of the transducer, especially, namely, to generate measurement values representing the at least one flow parameter. In turn, said transducer is formed by means of a tube—that is, for example, monolithic or assembled from individual parts—which is inserted into the course of a respective pipe—also designed, for example, as an equipment component of a heat supply network or a turbine circuit—and is used to conduct a fluid flowing through the tube in a specified flow direction. The tube comprises a metallic tube wall, a lumen enclosed thereby, and a metallic bluff body arranged at least partially in the lumen of the tube—for example, also connected thereto at an inner side of the tube wall facing the lumen—and therefore having fluid flowing around or through during operation. In the transducer shown in JP-A 0682281 or the measuring system formed therewith, the bluff body is designed, for example, as a prismatically shaped disturbance body, or the bluff body is in each case configured to induce, in the fluid flowing past, vortices having a shedding rate $(1/f_{V_{Tx}})$ dependent on the flow velocity of said fluid, in such a way that a Kármán vortex street is formed in the fluid flowing downstream of the bluff body. Alternatively, the bluff body, as is also shown, among other things, in US-A 2017/0328750, WO-A 2008/061551, WO-A 2009/158605 or WO-A 2013/180843, can also be configured, for example, to increase a flow velocity of a fluid flowing past and/or through and/or to decrease a static pressure prevailing in a fluid flowing past and/or through and/or to provoke a pressure difference, dependent on a volumetric flow, along a measuring section formed by means of the first and second sub-segments of the tube wall, or be designed as an orifice plate, namely, especially, as a standard orifice plate. As a result, each of the tubes correspondingly has a—usually circular—maximum first flow cross-section and a second flow cross-section, which deviates from said maximum flow cross-section, in at least one region adjoining the bluff body, for example formed between the bluff body and the tube wall and/or within the bluff body. As is also shown, among other things, in the aforementioned patent application WO-A 2009/158605, the tube can moreover have a circular third flow cross-section deviating both from said first flow cross-section and from the aforementioned second flow cross-section, for example designed to be larger than the second flow cross-section of the tube, in a region located upstream of the bluff body in the flow direction, but nevertheless downstream of the aforementioned first cross-section. In addition, in a region located downstream of the bluff body in the flow direction, the tube can have a fourth flow cross-section deviating both from the aforementioned first flow cross-section and from the aforementioned second flow cross-section, for example, namely designed to be larger than the second flow cross-section of the tube. The two third and fourth flow cross-sections can, for example, also be equally large and/or each be formed by a substantially hollow cylindrical first sub-segment of the tube enclosing a substantially circular cylindrical first region of the lumen, and by a substantially hollow cylindrical second sub-segment of the tube enclosing a substantially circular cylindrical second region of the lumen. The aforementioned first flow cross-section of the tube can, in turn, be accordingly formed by a third sub-segment of the tube enclosing a conical third region of the lumen and/or forming a concentric reduction in the flow direction.

For the purpose of generating the sensor signals, each of the aforementioned transducers comprises at least two—typically identically designed—sensor elements, of which a first sensor element is positioned in a region located upstream of the bluff body and a second sensor element is positioned in a region located downstream of the bluff body. At least in the case of the transducer shown in JP-A 0682281, the aforementioned second sensor element is used to detect pressure fluctuations in the Kármán vortex street formed in the flowing fluid, and to convert a sensor signal representing the pressure fluctuations, namely to supply a—here, electrical—signal that corresponds to a pressure prevailing within the fluid, which, due to opposing vortices, is subjected to periodic fluctuations downstream of the disturbance body, or has a signal frequency $(\sim f_{V_{Tx}})$ corresponding to the shedding rate of the vortices.

In the transducer shown in JP-A 0682281 or in WO-A 2009/158605, openings are provided in the tube wall for the purpose of connecting the sensor elements to the tube, or for the coupling to the fluid conducted therein, through which in each case a pressure line for transmitting pressure is guided or to which in each case such a pressure line is connected. A disadvantage of using such a pressure line is, among other things, that due to the openings in the tube wall, additional measures are required which seal the tube, together with the pressure lines, in a reliable and leak-free manner again. A further disadvantage is also to be seen in the fact that such pressure lines themselves may influence the measurement or may be the cause of measuring errors.

SUMMARY

Taking this into account, it is an object of the invention to provide a tube suitable for a transducer of the aforementioned type to which the at least two sensor elements required for the measurement can be coupled, even when dispensing with openings in the tube wall.

To achieve the object, the invention consists in a tube for conducting a fluid flowing through the tube in a specified flow direction, comprising: a, for example metallic and/or monolithic, tube wall enclosing a lumen of the tube, and a, for example metallic and/or monolithic, bluff body arranged inside the tube, but nevertheless connected thereto at an inner side of the tube wall facing the lumen. The tube wall of the tube according to the invention has a maximum wall thickness measuring more than 1 mm, for example more than 2 mm, and at least two mutually spaced, for example equally large and/or equally shaped, sub-segments, each having a wall thickness, for example measuring less than 1 mm and/or more than 0.1 mm, deviating from the maximum wall thickness, for example by more than 30% of said maximum wall thicknesses and/or by more than 1 mm, wherein a first sub-segment is positioned upstream of the bluff body in the flow direction and a second sub-segment is positioned at least partially in the flow direction downstream of the first sub-segment, for example, namely, at least partially in the region of the bluff body and/or at least partially in the flow direction downstream of the bluff body.

In addition, the invention consists in a transducer formed by means of such a tube and used to detect at least one measuring variable of a flowing fluid, which additionally comprises a, for example piezoelectric or capacitive or optical, first sensor element, which is fixed to the first sub-segment of the tube wall and/or in the vicinity thereof and which is configured to detect elastic deformations of said sub-segments, and to convert these into a first sensor signal corresponding to said deformations, for example using a voltage dependent on said deformation and/or an electrical current dependent on said deformation, and a second sensor element that is, for example piezoelectric or capacitive or optical and/or designed identically to the first sensor element, which is fixed to the second sub-segment of the tube wall and/or in the vicinity thereof and which is configured to detect elastic deformations of said sub-segments, and to convert a second sensor signal corresponding to said deformations, for example using a voltage dependent on said deformation and/or an electrical current dependent on said deformation.

The invention further also consists in a measuring system formed by means of such a transducer for measuring at least one flow parameter that is, for example, variable over time, for example, namely, a flow velocity and/or a volumetric flow, of a fluid flowing in a pipe, the measuring system additionally including a measurement electronics unit, which is configured to receive and process both the first sensor signal and the second sensor signal, namely to generate measurement values representing the at least one flow parameter.

According to a first embodiment of the invention, it is further provided that the tube has a maximum first flow cross section that measures, for example, more than 20 mm$^2$ and/or has a circular design. In a refinement of this embodiment, it is further provided that the tube, in at least one region adjoining the bluff body, for example, namely formed between the bluff body and the tube wall, has a second flow cross-section deviating from said maximum flow cross-section with respect to size and/or shape. Moreover, in a region located upstream of the bluff body in the flow direction, but nevertheless downstream of the first flow cross-section, the tube can have a third flow cross-section which deviates both from the first flow cross-section and from the second flow cross-section and is, for example, circular and/or designed to be larger than the second flow cross section, and, in a region located downstream of the bluff body in the flow direction, the tube can have a fourth flow cross-section which deviates both from the first flow cross-section and from the second flow cross-section and is, for example, designed to be identical to the third flow cross-section and/or circular and/or designed to be larger than the second flow cross section.

According to a second embodiment of the invention, it is further provided that the tube, upstream of the bluff body in the flow direction, comprises a, for example hollow cylindrical, first sub-segment that encloses a cylindrical, for example circular cylindrical, first region of the lumen, and wherein the tube, downstream of the bluff body in the flow direction, comprises a, for example hollow cylindrical, second sub-segment that encloses a cylindrical, for example circular cylindrical, second region of the lumen. In a refinement of this embodiment, it is further provided that the tube, upstream of the first sub-segment thereof in the flow direction, comprises a third sub-segment that encloses a conical third region of the lumen forming a concentric reduction in the flow direction, for example, and forms the first flow cross-section. Downstream of the second sub-segment in the flow direction, the tube may further also comprise a fourth sub-segment having a flow cross-section deviating from the flow cross-section of the second sub-segment.

According to a third embodiment of the invention, it is further provided that the first sub-segment of the tube wall is circular and/or planar on an outer side facing away from the lumen.

According to a fourth embodiment of the invention, it is further provided that the second sub-segment of the tube wall is circular and/or planar on an outer side facing away from the lumen.

According to a fifth embodiment of the invention, it is further provided that the first and second sub-segments of the tube wall are equally large and/or equally shaped, for example, namely, identically designed.

According to a sixth embodiment of the invention, it is further provided that the tube wall and the bluff body are components of one and the same monolithic molded part.

According to a seventh embodiment of the invention, it is further provided that the tube wall and the bluff body are made of the same material.

According to an eighth embodiment of the invention, it is further provided that the inner side of the tube wall has no weld seams.

According to a ninth embodiment of the invention, it is further provided that the tube wall is free of joints.

According to a tenth embodiment of the invention, it is further provided that the tube wall does not have any apertures or openings.

According to an eleventh embodiment of the invention, it is further provided that the inner side of the tube wall has no protrusions.

According to a twelfth embodiment of the invention, it is further provided that the inner side of the tube wall is smooth at least in the region of the sub-segments.

According to a thirteenth embodiment of the invention, it is further provided that the bluff body is configured to increase a flow velocity of a fluid flowing past and/or through and/or to decrease a static pressure prevailing in a fluid flowing past and/or through and/or to provoke a pressure difference, dependent on a volumetric flow, along a measuring section formed by means of the first and second sub-segments of the tube wall.

According to a fourteenth embodiment of the invention, it is further provided that the bluff body is to be configured to induce vortices in the fluid flowing past, for example in such a way that a Kármán vortex street is formed in the fluid flowing downstream of the bluff body and/or along a measuring section formed by means of the first and second sub-segments of the tube wall.

According to a fifteenth embodiment of the invention, it is further provided that the bluff body is designed as a prismatically shaped disturbance body.

According to a sixteenth embodiment of the invention, it is further provided that the bluff body is designed as an orifice plateorifice plate plate, for example, namely, as a standard orifice plate.

According to a seventeenth embodiment of the invention, it is further provided that the tube is produced by a metal injection molding (MIM) method.

According to a refinement of the invention, the tube moreover comprises a first connecting flange surrounding a first tube end on the inlet-side in the flow direction, and a second connecting flange surrounding a second tube end on the outlet-side in the flow direction. The tube wall and the first and second connecting flanges can also be integral parts of one and the same monolithic molded part, for example.

A basic idea of the invention is to avoid undesirable openings or apertures in the tube wall of a tube suitable for a transducer of the type in question by providing two sub-segments in the tube wall, which can each be used as a sensor pocket and which are each suitable for receiving at least one sensor element, wherein the wall thickness of each of the aforementioned sub-segments can readily be selected in such a way that, on the one hand, a deformation sufficient for generating or processing sensor signals generated by means of the sensor elements is made possible during operation and, on the other hand, sufficient compressive strength of the tube for operation is ensured.

BRIEF DESCRIPTION OF THE DRAWINGS

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, in particular combinations of partial aspects of the invention that were initially explained only separately, furthermore result from the figures of the drawing and from the claims themselves.

The figures show in detail:

FIGS. 3A and 3B show in a sectional side view and a front view, respectively, show a variant of a transducer suitable for a measuring system according to FIG. 1.

DETAILED DESCRIPTION

FIG. 1, 2, 3A, 3B, 4A or 4B are exemplary embodiments of a measuring system for measuring at least one measurement variable, which may optionally also be variable over time, especially, a flow parameter such as, e.g., a flow velocity v and/or a volumetric flow V, of a fluid flowing in the pipe. The pipe can be designed, for example, as an equipment component of a bottling facility, of a heat supply network or of a turbine circuit, so that the fluid can be, for example, an aqueous liquid, steam or, for example, also a condensate discharged from a steam line. However, fluid can also be, for example, (compressed) natural gas or a biogas, so that the pipe can also be a component of a natural gas or biogas plant or of a gas supply network, for example.

Figure 1:
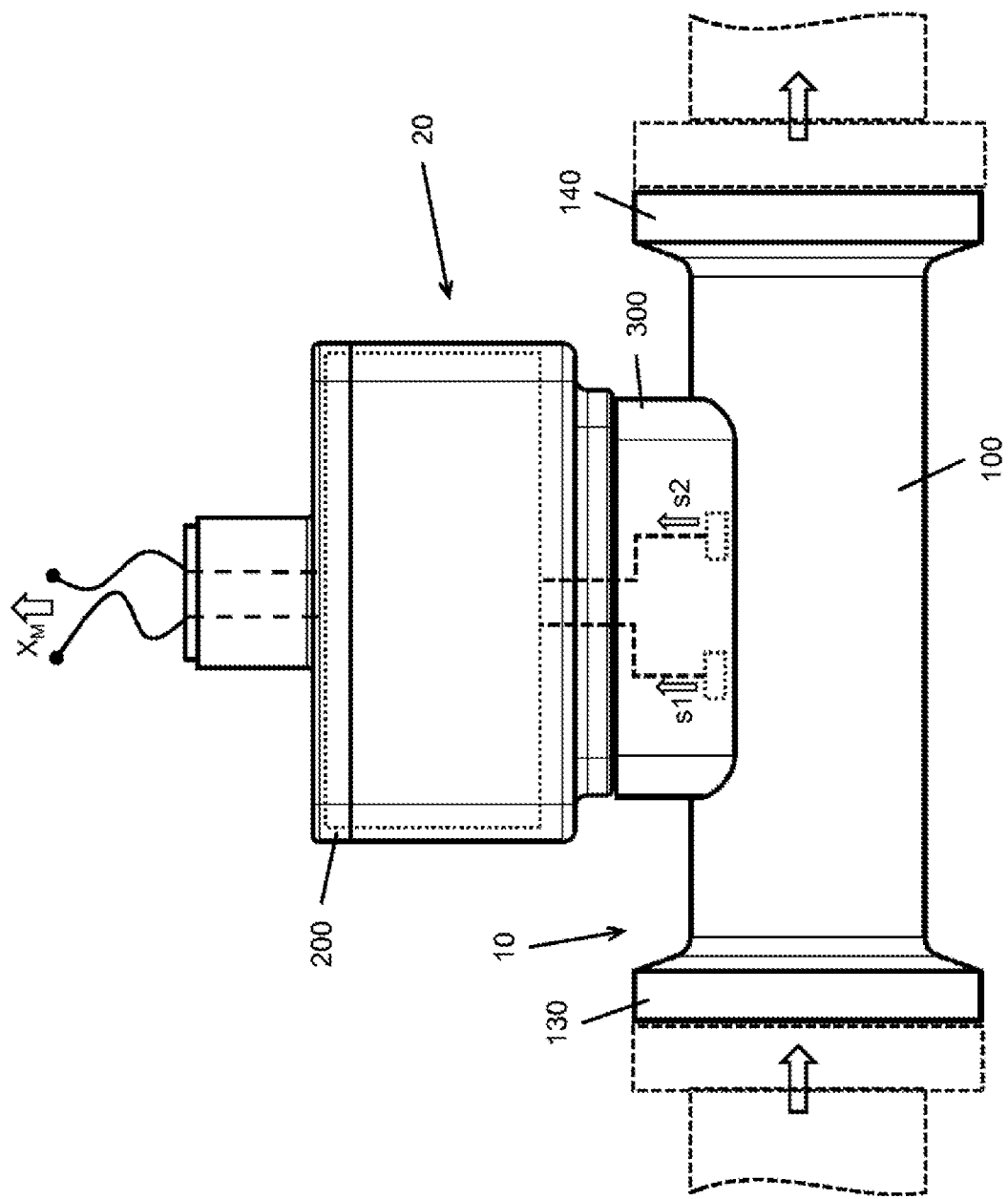
FIG. 1 shows in a side view, shows a measuring system formed by means of a transducer and a measurement electronics unit connected thereto for measuring a measurement variable of a fluid flowing in a pipe.
Figure 2:
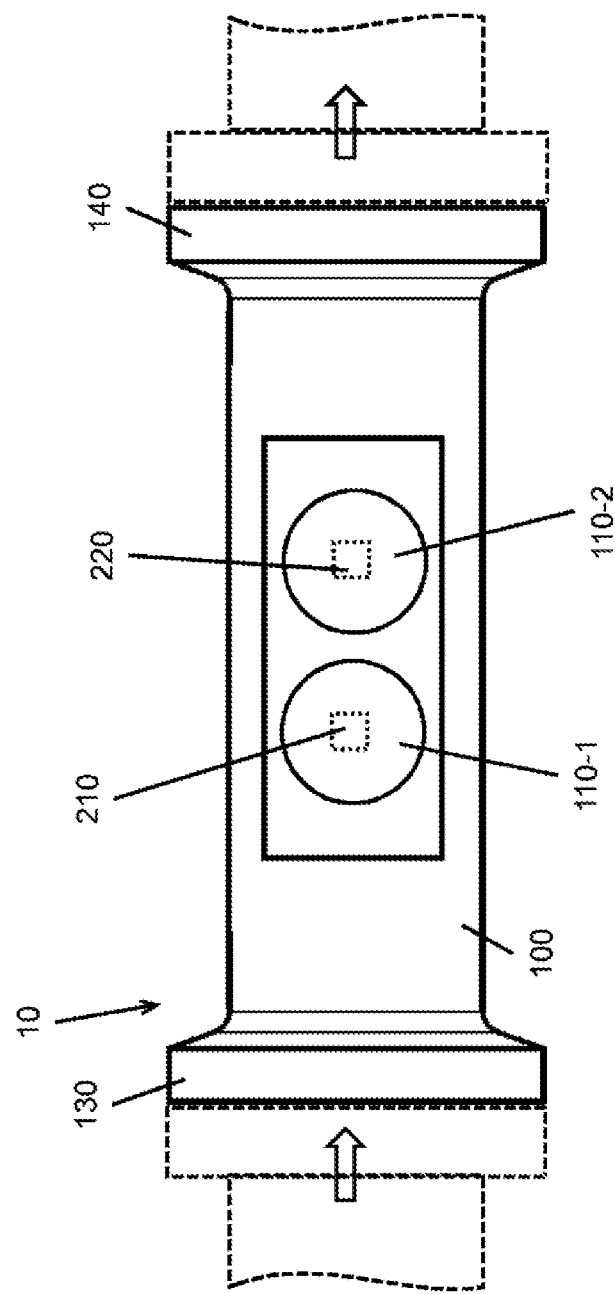
FIG. 2 shows in a top view, shows a transducer suitable for a measuring system according to FIG. 1.

In order to detect the at least one measurement variable, the measuring system comprises a transducer 10, which is provided or designed for fluid to flow through in a flow direction during operation and/or to detect pressures that vary over time in the flowing fluid and/or a pressure drop occurring in the flowing fluid and/or pressure fluctuations in the flowing fluid, for example in a Kármán vortex street formed therein, and to convert it/them into two, for example electrical or optical, sensor signals s1, s2 corresponding thereto. In addition, the measuring system comprises a measurement electronics unit 20, which is configured to receive and process the aforementioned sensor signals, for example, namely, to generate measurement values $X_M$ representing the at least one flow parameter. As is apparent from FIG. 1, the measuring system for this purpose furthermore comprises a measurement electronics unit 20—for example accommodated in a pressure-resistant and/or impact-resistant protective housing 200—which is electrically connected to the transducer 10 or communicates with the transducer 1 during operation of the measuring system. The measurement electronics unit 20 is, especially, configured to receive and process the sensor signals s1, s2, for example, namely, to generate measurement values $X_M$ representing the at least measurement variable. The measurement values $X_M$ can be visualized on-site and/or transmitted—by wire or in conformity with DIN 60381-1 via a connected field bus and/or wirelessly by radio or in conformity with IEEE 802.15.1 or IEEE 802.15.4—to an electronic data processing system, such as a programmable logic controller (SPS) and/or a process control station. The protective housing 200 for the measurement electronics unit 20 may, for example, be produced from a metal, such as a stainless steel or aluminum, and/or by means of a casting method, such as an investment casting or die casting method (HPDC); it can however, for example, also be formed by means of a plastic molded part produced in an injection molding method. As is also illustrated in FIG. 1, the measuring system can also be designed, for example, as a compact measuring system in which the protective housing 200, together with the measurement electronics unit 20 arranged therein, is positioned directly at the transducer 10 and is connected rigidly, possibly also releasably, to the transducer 10—for example by means of a neck-shaped connecting piece 300.

To conduct the flowing fluid, the transducer, as is also shown in FIGS. 3A and 3B, as well as 4A and 4B and is readily apparent from a combination of the figures, comprises a tube 100 including a—for example metallic and/or monolithic—tube wall 110 enclosing a lumen 100* of the tube, and a—for example metallic and/or monolithic—bluff body 120 arranged inside the tube 100 or the lumen 100 thereof, but nevertheless connected thereto at an inner side of the tube wall 110 facing the lumen 100. Said bluff body 120 can be provided or configured, for example, to increase a flow velocity of a fluid flowing past and/or through and/or to decrease a static pressure prevailing in a fluid flowing past and/or through, for example also in such a way that in this way a pressure difference, dependent on a volumetric flow, is provoked in the flow direction. As an alternative or in addition, the bluff body can also be designed to induce vortices in the fluid flowing past, for example also in such a way that a Kármán vortex street is formed in the fluid flowing downstream of the bluff body. The tube wall and the bluff body can advantageously be made, for example, of the same material, for example, namely, a steel, optionally also a stainless steel, or a nickel-based alloy. According to a further embodiment of the invention, the tube wall and the bluff body are components of one and the same monolithic molded part. As a result, the tube wall can advantageously be kept free of joints—which are usually complex to create and/or to test—or undesirable or disruptive weld seams on the inner side of the tube wall can be avoided. According to a further embodiment of the invention, the tube is produced by a metal injection molding (MIM) method for this reason. In the metal injection molding method, initially a pasty, but nevertheless sprayable composition having a metal powder content of typically more than 90 wt. % (percent by weight) is produced from a fine metal powder and a likewise pulverulent plastic material and processed by means of an injection molding machine—which is also suitable, for example, for conventional plastic injection molding—to form a molded part corresponding to the tube to be produced. Moreover, in the metal injection molding process, the plastic material is removed again from this molded part while retaining its shape, and the metal remaining in the molded part is finally sintered. By employing such a metal injection molding method for producing the tube, the tube wall 110, and last but not least also the sub-segments 110-1, 110-2 thereof, can be manufactured very precisely, possibly even while avoiding otherwise very complex reworking of the tube 100 or of the surfaces thereof.

According to another embodiment of the invention, the tube 100 further has, as is also indicated in FIGS. 3A and/or 3B or readily apparent from a combination of FIGS. 3A, 3B, 4A and 4B, a first flow cross-section $A_1$—for example, measuring more than 20 mm$^2$ and/or having a circular design—which at the same time corresponds to a maximum flow cross-section of the tube 100 (A1→Amax). In the case of a lumen 100 having only circular flow cross-sections, a diameter of the flow cross-section $A_1$, for example also measuring more than 5 mm, also corresponds to a maximum diameter of the lumen 100*. For the purpose of incorporating the tube or the transducer formed therewith, according to a further embodiment of the invention the tube 100 can comprise a first connecting flange 130 receiving a first tube end 10+ on the inlet-side in the flow direction, and a second connecting flange 140 receiving a second tube end 10# on the outlet-side in the flow direction. As is also indicated in each of FIGS. 1, 3A and 4A, the tube wall 110 and connecting flanges 130, 140 may moreover also comprise, for example, components of one and the same monolithic molded part, for example also comprising the bluff body 120.

The tube 100 can further, for example, be designed so as to comprise, upstream of the bluff body 120 in the flow direction, a, for example also hollow cylindrical, first sub-segment 100-1 that encloses a cylindrical, optionally also—as is indicated in each case in FIGS. 3A and 3B and 4A and 4B —circular cylindrical first region of the lumen and, downstream of the bluff body 120 in the flow direction, comprises a, for example hollow cylindrical, second sub-segment 100-2 that encloses a cylindrical, for example circular cylindrical, second region of the lumen. According to a further embodiment of the invention, it is further provided that the tube 100, in addition to the aforementioned sub-segments 100-1, 100-2, upstream of the aforementioned sub-segment 100-1 in the flow direction, comprises a third sub-segment 100-3 that encloses a conical third region of the lumen, for example forming a concentric reduction in the flow direction, and optionally also forms the flow cross-section $A_1$. Downstream of the aforementioned sub-segment 100-2 in the flow direction, the tube 100 can comprise a fourth sub-segment 100-4, which forms a diffuser or, in the flow direction, a widening, or else forms a throttle or, in the flow direction, a reduction and which has a flow cross-section that deviates from the flow cross-section of the sub-segment 100-2, for example that is increased or reduced compared to said flow cross-section of the sub-segment 100-2.

According to a further embodiment of the invention, the tube 100, as is indicated in each case in FIGS. 3A and 3B or is apparent from their combination, in at least one region adjoining the bluff body 120, for example also formed between the bluff body 120 and the tube wall 110, has a second flow cross-section $A_2$ deviating from the aforementioned maximum flow cross-section $A_1$ with respect to size and/or shape. Moreover, in a region located upstream of the bluff body 120 in the flow direction, but nevertheless downstream of the flow cross-section $A_1$, the tube 100 can have a third flow cross-section $A_3$—for example, also designed to be larger than said flow cross section $A_2$—which deviates both from said flow cross-section $A_1$ and from the aforementioned flow cross-section $A_2$ with respect to the and/or shape, and, in a region located downstream of the bluff body 120 in the flow direction, a fourth flow cross-section $A_4$—for example, also designed to be identical to the aforementioned flow cross-section $A_3$ and/or designed to be larger than the flow cross section $A_2$—which likewise deviates both from the flow cross-section $A_1$ and from the flow cross-section $A_2$ with respect to size and/or shape. The flow cross-section $A_3$ and/or the flow cross-section $A_4$ may also be designed to be circular, for example. In addition, the flow cross-section $A_3$ can be formed by the aforementioned sub-segment 100-1 of the tube 100, and the flow cross-section $A_4$ can be formed by the aforementioned sub-segment 100-2 of the tube 100.

Figure 4A:
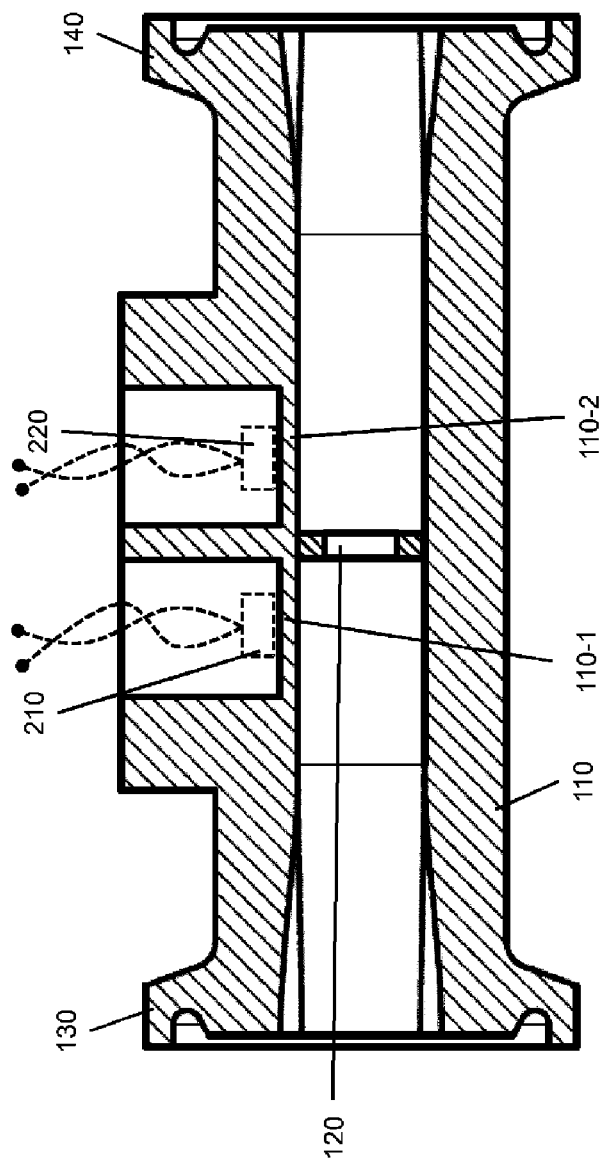
FIGS. 4A and 4B show in a sectional side view and in a front view, respectively, show a further variant of a transducer suitable for a measuring system according to FIG. 1.

In the case of the tube 100 according to the invention, the tube wall 110 has a maximum wall thickness $s_{max}$ measuring more than 1 mm, which, for example, is constant circumferentially or along an imaginary circumferential line, and at least two mutually spaced, especially in the flow direction, for example equally large and/or equally shaped, sub-segments (110-1, 110-2), each having a wall thickness $s_{110-1}$ or $s_{110-2}$ deviating from the aforementioned maximum wall thickness $s_{max}$ (namely being less compared thereto), of these two sub-segments, as is also apparent from FIGS. 3A and 4A, a first sub-segment 110-1 being positioned upstream of the bluff body 120 in the flow direction, and a second sub-segment 110-2 being positioned downstream of the sub-segment 110-1 in the flow direction—for example, namely, also at least partially in the region of the bluff body 120, optionally also partially in the flow direction downstream of the bluff body 120. The two sub-segments 110-1, 110-2 are provided, especially, so as to each receive at least one sensor element used for generating one of the aforementioned sensor signals or form corresponding sensor pockets of the tube. The sub-segments 110-1, 110-2 of the tube wall 110 can advantageously be accordingly designed to be equally large and/or equally shaped, for example, namely, identically designed, and/or be circular. Alternatively or in addition, the sub-segment 100-1 and/or the sub-segment 100-2 can be flat on a respective outer side facing away from the lumen, for example so as to allow the respective sensor element to be coupled as simply as possible to the respective sub-segment. As a result, the tube wall can advantageously also be designed, for example, so as not to have any apertures or openings and/or so as not to include any protrusions or so as to be smooth at least in the region of the sub-segments 110-1, 110-2.

According to a further embodiment of the invention, the transducer formed by means of the tube 100 accordingly comprises a first sensor element 210, which is fixed to the sub-segment 110-1 or in the vicinity thereof, for example integrally or adhesively, and is configured to detect elastic deformations of said sub-segment and convert these into a first sensor signal corresponding to said deformations, for example, namely, using a voltage dependent on said deformation and/or an electrical current dependent on said deformation. The transducer further comprises a second sensor element 220, for example also identical to the sensor element 210, which is fixed to the sub-segment 110-2 or in the vicinity thereof, for example, integrally or adhesively, and is configured to detect elastic deformations of said sub-segment and to convert these into a second sensor signal corresponding to said deformations, for example using a voltage dependent on said deformation and/or an electrical current dependent on said deformation. Each of the sensor elements 210, 220 may, for example, be designed as a piezoelectric, capacitive or also optical sensor element. The wall thickness $s_{110\text{-}1}$, $s_{110\text{-}2}$ of the aforementioned sub-segments 110-1, 110-2 is advantageously selected in each case in such a way that, during operation, a deformation sufficient for generating or processing the sensor signals s1, s2 is made possible, but nevertheless sufficient compressive strength of the tube is ensured, and can measure less than 1 mm and/or more than 0.1 mm, for example, and/or can also be selected in each case, for example, so as to deviate from the maximum wall thickness by more than 1 mm and/or by more than 30% of the maximum wall thicknesses. The aforementioned maximum wall thickness can, in turn, also be more than 2 mm, for example, namely, also more than 5 mm. According to a further embodiment of the invention, it is further provided that each of the sub-segments 110-1, 110-2 on the respective side facing away from the lumen 100* in each case has a largest diameter, which is not greater than a maximum diameter of the aforementioned flow cross-section $A_1$ and/or is less than 20 mm.

According to another embodiment of the invention, the bluff body is configured to induce vortices in a fluid flowing past in such a way that a Kármán vortex street is formed in the fluid flowing downstream of the bluff body 120 and/or along a measuring section formed by means of the sub-segments 110-1, 110-2 of the tube wall 110, and/or the bluff body 120, as is also indicated in FIGS. 3A and 3B or apparent from their combination, is designed as a prismatically shaped disturbance body. The sub-segments 110-1, 110-2 of the tube wall 110 and the bluff body 120 are, especially, dimensioned and arranged in the process in such a way that the sub-segment 110-2 adjoins the lumen 100* of the tube 100 in a region, or makes contact with the fluid conducted in a region, that during operation of the measuring system—designed, for example, as a vortex flow meter—is regularly taken up by the aforementioned Kármán vortex street, so that the pressure fluctuations detected by means of the sensor element 220 and caused by vortices shed at the bluff body 120 at a shedding rate ($\sim 1/f_{V\!tx}$) are periodic pressure fluctuations, and the sensor signal s2 has a signal frequency ($\sim f_{V\!tx}$) corresponding to the shedding rate of said vortices. The measuring electronics unit 20 can accordingly further also be configured to ascertain a measurement variable to be detected, for example, namely, the flow velocity and/or the volumetric flow, based on the signal frequency of the sensor signal s2, optionally also—as shown in the aforementioned JP-A 0682281—taking into account also the sensor signal s1.

Figure 4B:
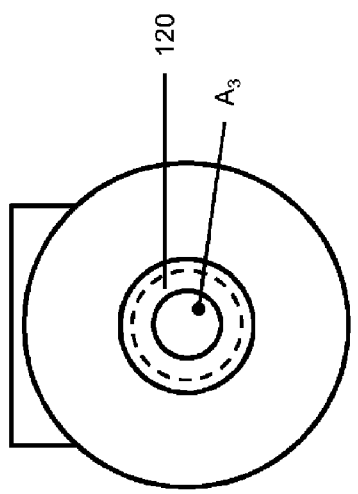

According to another embodiment of the invention, the bluff body 120 is provided or configured to provoke a pressure difference, dependent on a volumetric flow, along a measuring section formed by means of the aforementioned sub-segments 100-1, 100-2 of the tube wall 110, and/or the bluff body, as is also schematically shown in FIGS. 4A and 4B or is apparent from their combination, is designed as an orifice plate, for example, namely, as a standard orifice plate. The measuring electronics unit 20 may further also be configured to ascertain, based on the sensor signals s1, s2, the aforementioned pressure difference and, derived therefrom, measurement values for the at least one measurement variable to be detected.

The invention claimed is:
1. A measuring system for measuring at least one flow parameter, which is variable over time, of a fluid flowing in a pipe, the measuring system comprising:
a transducer configured to detect pressure fluctuations in a Kármán vortex street formed in the flowing fluid, the transducer comprising:
a tube configured to conduct a fluid flowing through the tube in a predetermined flow direction, the tube comprising:
a tube wall which defines a lumen of the tube, the tube wall having a maximum wall thickness of more than 1 mm; and
a bluff body disposed within the lumen and connected to an inner side of the tube wall facing the lumen,
wherein the tube wall comprises two mutually spaced, equally shaped sub-segments, each having a sub-segment wall thickness deviating from the maximum wall thickness by more than 30% of the maximum wall thicknesses and/or by more than 1 mm, and each sub-segment wall thickness being less than 1 mm and/or more than 0.1 mm,
wherein the two sub-segments include a first sub-segment disposed upstream of the bluff body relative to the flow direction and a second sub-segment disposed downstream of the first sub-segment relative to the flow direction and at least partially downstream of the bluff body,
wherein the bluff body is configured to induce vortices in the flowing fluid such that the Kármán vortex street is formed in the fluid flowing down- stream of the bluff body and along a measuring section defined by the first and second sub-segments of the tube wall;
a piezoelectric, capacitive or optical first sensor element, which is fixed to the first sub-segment of the tube wall and is configured to detect elastic deformations of the first sub-segment and to convert the detected deformations into a first sensor signal corresponding to the deformations using a voltage and/or an electrical current dependent on the deformations; and
a piezoelectric, capacitive or optical second sensor element, identical to the first sensor element, which is fixed to the second sub-segment of the tube wall and is configured to detect elastic deformations of the second sub-segment and to convert the detected deformations into a second sensor signal corresponding to the deformations using a voltage and/or an electrical current dependent on the deformations,
wherein the second signal relative to the first signal represents the pressure fluctuations in the Kármán vortex street formed in the flowing fluid; and
a measurement electronics unit configured to receive and process the first sensor signal and the second sensor signal and to generate measurement values representing the at least one flow parameter.

2. The measuring system of claim 1, wherein the tube has a maximum first flow cross-section more than 20 mm$^2$ and/or has a circular design.

3. The measuring system of claim 2, wherein the tube, in at least one region adjoining the bluff body has a second flow cross-section deviating from the first flow cross-section with respect to size and/or shape.

4. The measuring system of claim 3, wherein, in a region upstream of the bluff body and downstream of the first flow cross-section, the tube has a third flow cross-section, which deviates from both the first flow cross-section and the second flow cross-section and is circular and/or larger than the second flow cross-section of the tube, and
in a region downstream of the bluff body, the tube has a fourth flow cross-section, which deviates from both the first flow cross-section and the second flow cross-section with respect to size and/or shape and is identical to the third flow cross-section and/or circular and/or larger than the second flow cross-section of the tube.

5. The measuring system of claim 4, wherein the first sub-segment defines the third flow cross-section, and wherein the second sub-segment defines the fourth flow cross-section.

6. The measuring system of claim 5, wherein upstream of the first sub-segment the tube comprises a third sub-segment that encloses a conical third region of the lumen, thereby forming a concentric reduction in the flow direction, and defines the first flow cross-section.

7. The measuring system of claim 6, wherein downstream of the second sub-segment the tube comprises a fourth sub-segment having a flow cross-section deviating from the flow cross-section of the second sub-segment.

8. The measuring system of claim 1, wherein the first sub-segment has a hollow cylindrical form that encloses a cylindrical first region of the lumen, and the second sub-segment has a hollow cylindrical form that encloses a cylindrical second region of the lumen.

9. The measuring system of claim 1, wherein the first sub-segment of the tube wall is circular and/or planar on an outer side facing away from the lumen; and/or
wherein the second sub-segment of the tube wall is circular and/or planar on an outer side facing away from the lumen.

10. The measuring system of claim 1, wherein the tube wall and the bluff body are portions of one and the same monolithic molded part; and/or
wherein the tube wall and the bluff body are made of the same material.

11. The measuring system of claim 1, wherein the inner side of the tube wall has at least one of the following:
no weld seams, no protrusions, and an entirely smooth surface at least in the region of the sub-segments; and/or
wherein the tube wall is free of joints and/or has no apertures or openings.

12. The measuring system of claim 1, wherein the tube further comprises:
a first connecting flange surrounding a lateral first tube end on an inlet-side in the flow direction; and
a second connecting flange surrounding a second tube end on an outlet-side in the flow direction.

13. The measuring system of claim 12, wherein the tube wall and the first and second connecting flanges are portions of one and the same monolithic molded part.

14. The measuring system of claim 1, wherein the bluff body is configured to increase a flow velocity of the fluid flowing passed and/or to decrease a static pressure prevailing in the fluid flowing passed and/or to produce a pressure difference dependent on a volumetric flow of the fluid along a measuring section defined by the first and second sub-segments of the tube wall.

15. The measuring system of claim 1, wherein the bluff body is a prismatically shaped disturbance body.

16. The measuring system of claim 1, wherein the tube is manufactured by a metal injection molding (MIM) method.

17. The measuring system of claim 1, wherein the two sub-segments are separated and at least partially defined by a wall extending away from the lumen.

18. The measuring system of claim 17, wherein the tube comprises a connecting body opposite the lumen, the connecting body at least partially including the two sub-segments and the wall the two sub-segments.

* * * * *